(12) United States Patent
Yu et al.

(10) Patent No.: US 11,624,827 B2
(45) Date of Patent: Apr. 11, 2023

(54) METHOD FOR GENERATING A HIGH PRECISION MAP, APPARATUS AND STORAGE MEDIUM

(71) Applicant: APOLLO INTELLIGENT DRIVING TECHNOLOGY(BEIJING) CO., LTD., Beijing (CN)

(72) Inventors: Li Yu, Beijing (CN); Shiyu Song, Sunnyvale, CA (US); Fangfang Dong, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 871 days.

(21) Appl. No.: 16/459,687

(22) Filed: Jul. 2, 2019

(65) Prior Publication Data
US 2019/0323843 A1   Oct. 24, 2019

(30) Foreign Application Priority Data

Jul. 4, 2018   (CN) .......................... 201810726583.4

(51) Int. Cl.
*G01S 17/89* (2020.01)
*G06T 7/73* (2017.01)
(Continued)

(52) U.S. Cl.
CPC .............. *G01S 17/89* (2013.01); *G01C 21/26* (2013.01); *G01S 7/4808* (2013.01); *G06T 7/74* (2017.01);
(Continued)

(58) Field of Classification Search
CPC .......... G01C 21/26; G06T 2207/10028; G06T 2207/20076; G06T 2207/30252; G06T 7/74; G01S 17/89; G01S 7/4808
See application file for complete search history.

(56) References Cited

U.S. PATENT DOCUMENTS 9,315,192 B1   4/2016   Zhu et al.
9,619,561 B2 *  4/2017   Chrysanthakopoulos ..................
                                                        G06V 20/20
(Continued)

FOREIGN PATENT DOCUMENTS

CN   103617647 A   3/2014
CN   105204510 A   12/2015
(Continued)

OTHER PUBLICATIONS

Brulte, Grayson, "DeepMap featured by Autonomous Tomorrow", YouTube. 1 page, video link is 6:11minutes, available at https://youtu.be/6rd7PEFsBoQ: last accessed Apr. 8, 2022 (Year: 2017).*
(Continued)

*Primary Examiner* — Daniel L Greene
(74) *Attorney, Agent, or Firm* — Dilworth IP, LLC (57) ABSTRACT

A method and an apparatus for generating a high precision map, and a storage medium for generating a high precision map. The method includes: performing a point cloud splicing process on target point cloud data to obtain a lidar pose corresponding to the target point cloud data; projecting the target point cloud data into a preset two-dimensional area based on the lidar pose to generate a map based on a reflection value and a height value; performing a self-positioning verification on the map based on the reflection value and the height value using the target point cloud data; and integrating, if a result of the self-positioning verification satisfies a preset condition, the map based on the reflection value and the height value into a reference map to generate the high precision map.

20 Claims, 5 Drawing Sheets

(51) Int. Cl.
*G01C 21/26* (2006.01)
*G01S 7/48* (2006.01)
(52) U.S. Cl.
CPC ............... *G06T 2207/10028* (2013.01); *G06T 2207/20076* (2013.01); *G06T 2207/30252* (2013.01)

(56) References Cited

U.S. PATENT DOCUMENTS

| | | | |
|---|---|---|---|
| 2017/0186186 A1* | 6/2017 | Yamaguchi | G01C 21/28 |
| 2018/0216942 A1* | 8/2018 | Wang | G01C 21/32 |
| 2018/0306922 A1* | 10/2018 | Wan | G01S 17/89 |
| 2018/0364349 A1* | 12/2018 | Kudrynski | G01C 21/367 |
| 2019/0011566 A1* | 1/2019 | Yan | G01S 17/89 |
| 2019/0122386 A1* | 4/2019 | Wheeler | G01S 7/4817 |
| 2019/0146062 A1* | 5/2019 | Wan | G05D 1/0088 345/419 |
| 2019/0154842 A1* | 5/2019 | Adachi | G01S 19/45 |
| 2019/0271549 A1* | 9/2019 | Zhang | G05D 1/0246 |
| 2019/0329407 A1* | 10/2019 | Qi | G05D 1/0234 |

FOREIGN PATENT DOCUMENTS

| | | |
|---|---|---|
| CN | 105260988 A | 1/2016 |
| CN | 105513132 A | 4/2016 |
| CN | 106023210 A | 10/2016 |
| CN | 106097444 A | 11/2016 |
| CN | 106908775 A | 6/2017 |
| CN | 106909775 A | 6/2017 |
| CN | 107063129 A | 8/2017 |

OTHER PUBLICATIONS

First Office Action in CN Patent Application No. 201810726583.4 dated Jul. 2, 2019. 9 pages.
First Office Action issued in CN Application No. 201810726583.4; dated Jul. 2, 2019; 9 pages.
Second Office Action and Search Report issued in CN Application No. 201810726583.4; dated Sep. 29, 2019; 4 pages.

* cited by examiner

METHOD FOR GENERATING A HIGH PRECISION MAP, APPARATUS AND STORAGE MEDIUM

CROSS-REFERENCE TO RELATED APPLICATION

This application claims priority to Chinese Patent Application No. 201810726583.4, filed on Jul. 4, 2018, which is hereby incorporated by reference in its entirety.

TECHNICAL FIELD

Embodiments of the present disclosure relate to computer technologies, and in particular, to a method for generating a high precision map, an apparatus and a storage medium.

BACKGROUND

With a rapid development of the computer technologies, an application of maps has become widespread. For example, a high precision map plays an important role in an automatic driving system for an unmanned vehicle. Specifically, in the automatic driving system for the unmanned vehicle, whether it is perception, path planning, or positioning system, the high precision map is relied on to varying degrees.

The related technologies mainly rely on a high precision global positioning result provided by a GNSS/SINS integrated navigation system to generate a map. However, it is found that the related technologies is only suitable for generating the map in a specific small range, such as a centimeter-level accuracy can be really provided in an open highway or the like. For a large-scale urban mapping scenario, road conditions are more complicated, and due to weak GPS signals and multipath effects, a high precision mapping requirement cannot be satisfied.

SUMMARY

The embodiments of the present disclosure provide a method for generating a high precision map, an apparatus, and a storage medium to obtain a high precision map with a wider application range.

In a first aspect, an embodiment of the present disclosure provides a method for generating a high precision map, including: performing a point cloud splicing process on target point cloud data to obtain a lidar pose corresponding to the target point cloud data; projecting the target point cloud data into a preset two-dimensional area based on the lidar pose to generate a map based on a reflection value and a height value, where a global area includes a plurality of the preset two-dimensional areas, the map based on the reflection value and the height value stores a number of laser spots, reflection value information of the laser spots and height value information of the laser spots projected therein in units of the preset two-dimensional area, the target point cloud data includes data corresponding to a plurality of laser spots; performing a self-positioning verification on the map based on the reflection value and the height value using the target point cloud data; and integrating, if a result of the self-positioning verification satisfies a preset condition, the map based on the reflection value and the height value into a reference map to generate the high precision map, where the reference map is a previously generated map.

In a possible design, the performing a point cloud splicing process on target point cloud data to obtain a lidar pose corresponding to the target point cloud data includes: determining a source point cloud data which has an overlap area with a scan area of the target point cloud data; and obtaining the lidar pose corresponding to the target point cloud data by performing a point cloud splicing process on the target point cloud data and the source point cloud data.

In a possible design, the obtaining the lidar pose corresponding to the target point cloud data by performing a point cloud splicing process on the target point cloud data and the source point cloud data includes: determining a pose adjustment amount of the target point cloud data relative to the source point cloud data, where the pose adjustment amount is configured to indicate that a pose of a source lidar corresponding to the source point cloud data is translated and/or rotated, so that the pose of the source lidar has a same adjustment amount with a pose of a target lidar corresponding to the target point cloud data; constructing an objective function according to the pose adjustment amount and a priori pose constraint, where the priori pose constraint is configured to indicate an adjustment amount of a lidar pose initial value corresponding to the target point cloud data relative to a lidar pose initial value corresponding to the source point cloud data; and minimizing the objective function to determine the lidar pose corresponding to the target point cloud data.

In a possible design, the projecting the target point cloud data into a preset two-dimensional area based on the lidar pose to generate a map based on a reflection value and a height value includes: projecting the target point cloud data into the preset two-dimensional area based on the lidar pose; performing an aggregation process on data corresponding the laser spots projected into the preset two-dimensional area; and storing an aggregation processed data corresponding to the preset two-dimensional area, where the aggregation processed data includes the number of the laser spots, a mean and a variance of the reflection value corresponding to the laser spots and a mean and a variance of the height value corresponding to the laser spots.

In a possible design, the performing a self-positioning verification on the map based on the reflection value and the height value using the target point cloud data includes: projecting the target point cloud data into the preset two-dimensional area based on a lidar pose initial value corresponding to the target point cloud data to obtain a feature value corresponding to each laser spot in the target point cloud data, where the feature value includes a mean and a variance of the reflection value and a mean and a variance of the height value before the performing the point cloud splicing process on the target point cloud data; performing a matching process on the feature value corresponding to each laser spot in the target point cloud data and the reflection value information and the height value information of the laser spots in a corresponding preset two-dimensional area in the map based on the reflection value and the height value; and positioning a vehicle according to a result of matching process to obtain the result of the self-positioning verification, where the target point cloud data is collected by the vehicle.

In a possible design, the matching process is specifically includes: calculating a matching probability of each position respectively within a preset range centered on an initial predicted position to obtain a probability distribution of a positioning result, where the initial predicted position is a prediction of a vehicle position of the target point cloud data in a current frame completed by a positioning result of the target point cloud data in a previous frame together with a vehicle motion information given by a inertial navigation device; and updating the probability distribution of the positioning result by a histogram filter to obtain the matching process result.

In a possible design, the integrating the map based on the reflection value and the height value into a reference map to generate the high precision map includes: updating, in units of the preset two-dimensional area, the number of the laser spots, the reflection value information of the laser spots and the height value information of the laser spots in a corresponding preset two-dimensional area in the reference map according to the number of the laser spots, the reflection value information of the laser spots and the height value information of the laser spots in each preset two-dimensional area of the map based on the reflection value and the height value.

In a possible design, before the performing a point cloud splicing process on target point cloud data to obtain a lidar pose corresponding to the target point cloud data, the method further includes: receiving the target point cloud data sent by a vehicle.

In a possible design, the target point cloud data is a point cloud data preprocessed by the vehicle, where the preprocess includes filtering data having a duration shorter than a first preset value, and/or data having a corresponding number of kilometers less than a second preset value.

In a possible design, after the integrating the map based on the reflection value and the height value into a reference map to generate the high precision map, the method further includes: performing a self-positioning verification on the high precision map using another target point cloud data; and integrating, if a result of the self-positioning verification satisfies the preset condition, the another target point cloud data into the high precision map.

In a second aspect, the embodiment of the present disclosure provides a device for generating a high precision map, including:

a splicing process module, configured to perform a point cloud splicing process on target point cloud data to obtain a lidar pose corresponding to the target point cloud data;

a projecting module, configured to project the target point cloud data into a preset two-dimensional area based on the lidar pose obtained by the splicing process module to generate a map based on a reflection value and a height value, where a global area includes a plurality of the preset two-dimensional areas, the map based on the reflection value and the height value stores the number of the laser spots, reflection value information of laser spots and height value information of the laser spots projected therein in units of the preset two-dimensional area, the target point cloud data includes data corresponding to a plurality of laser spots;

a self-positioning verification module, configured to perform a self-positioning verification on the map based on the reflection value and the height value generated by the projecting module using the target point cloud data;

a map generating module, configured to integrate, when a result of the self-positioning verification obtained by the self-positioning verification module satisfies a preset condition, the map based on the reflection value and the height value into a reference map to generate the high precision map, where the reference map is a previously generated map.

In a possible design, the splicing process module includes: a determining unit, configured to determine a source point cloud data which has an overlap area with a scan area of the target point cloud data; and a splicing process unit, configured to obtain the lidar pose corresponding to the target point cloud data by performing a point cloud splicing process on the target point cloud data and the source point cloud data.

In a possible design, the splicing process unit is specifically configured to: determine a pose adjustment amount of the target point cloud data relative to the source point cloud data, where the pose adjustment amount is configured to indicate that a pose of a source lidar corresponding to the source point cloud data is translated and/or rotated, so that the pose of the source lidar has a same adjustment amount with a pose of a target lidar corresponding to the target point cloud data; construct an objective function according to the pose adjustment amount and a priori pose constraint, where the priori pose constraint is configured to indicate an adjustment amount of a lidar pose initial value corresponding to the target point cloud data relative to a lidar pose initial value corresponding to the source point cloud data; and minimize the objective function to determine the lidar pose corresponding to the target point cloud data.

In a possible design, the projecting module is specifically configured to: project the target point cloud data into the preset two-dimensional area based on the lidar pose;

perform an aggregation process on data corresponding the laser spots projected into the preset two-dimensional area; and store an aggregation processed data corresponding to the preset two-dimensional area, where the aggregation processed data includes the number of the laser spots, a mean and a variance of the reflection value corresponding to the laser spots and a mean and a variance of the height value corresponding to the laser spots.

In a possible design, the self-positioning verification module is specifically configured to: project the target point cloud data into the preset two-dimensional area based on a lidar pose initial value corresponding to the target point cloud data to obtain a feature value corresponding to each laser spot in the target point cloud data, where the feature value includes a mean and a variance of the reflection value and a mean and a variance of the height value before the performing the point cloud splicing process on the target point cloud data; perform a matching process on the feature value corresponding to each laser spot in the target point cloud data and the reflection value information and the height value information of the laser spots in a corresponding preset two-dimensional area in the map based on the reflection value and the height value; and position a vehicle according to a result of matching process to obtain the result of the self-positioning verification, where the target point cloud data is collected by the vehicle.

In a possible design, the matching process specifically includes: calculating a matching probability of each position respectively within a preset range centered on an initial predicted position to obtain a probability distribution of a positioning result, where the initial predicted position is a prediction of a vehicle position of the target point cloud data in a current frame completed by a positioning result of the target point cloud data in a previous frame together with a vehicle motion information given by a inertial navigation device; and updating the probability distribution of the positioning result by a histogram filter to obtain the matching process result.

In a possible design, the map generating module is specifically configured to: update, in units of the preset two-dimensional area, the number of the laser spots, the reflection value information of the laser spots and the height value information of the laser spots in a corresponding preset two-dimensional area in the reference map according to the number of the laser spots, the reflection value information of the laser spots and the height value information of the laser spots in each preset two-dimensional area of the map based on the reflection value and the height value.

In a possible design, the device for generating the high precision map further includes: a receiving module, configured to receive the target point cloud data sent by a vehicle before the splicing process module performs the point cloud splicing process on the target point cloud data to obtain the lidar pose corresponding to the target point cloud data.

In a possible design, the target point cloud data is a point cloud data preprocessed by the vehicle, where the preprocess includes filtering data having a duration shorter than a first preset value, and/or data having a corresponding number of kilometers less than a second preset value.

In a possible design, the self-positioning verification module is further configured to perform a self-positioning verification on the high precision map using an another target point cloud data after the map generating module integrates the map based on the reflection value and the height value into the reference map to generate the high precision map. Correspondingly, the map generating module is further configured to integrate, if a result of the self-positioning verification obtained by the self-positioning verification module satisfies the preset condition, the another target point cloud data into the high precision map.

In a third aspect, the embodiment of the present disclosure provides an electronic device, including: a processor and a memory; where the memory stores computer execution instructions; and the processor executes the computer execution instructions, so that the processor executes the method for generating the high precision map according to any one of the first aspect.

In a fourth aspect, the embodiment of the present disclosure provides a computer readable storage medium, where the computer readable storage medium stores computer execution instructions, the computer execution instructions, when executed by a processor, implement the method for generating the high precision map according to any one of the first aspect.

The method and apparatus for generating a high precision map, and the storage medium provided by the embodiment of the present disclosure perform a point cloud splicing process on a target point cloud data to obtain a lidar pose corresponding to the target point cloud data; project the target point cloud data into a preset two-dimensional area based on the lidar pose to generate a map based on a reflection value and a height value, where a global area includes a plurality of the preset two-dimensional areas, the map based on the reflection value and the height value stores a number of laser spots, reflection value information of the laser spots and height value information of the laser spots projected therein in units of the preset two-dimensional area, the target point cloud data includes data corresponding to a plurality of laser spots; perform a self-positioning verification on the map based on the reflection value and the height value using the target point cloud data; integrate, if a result of the self-positioning verification satisfies a preset condition, the map based on the reflection value and the height value into a reference map to generate the high precision map, where the reference map is a previously generated map. Since the embodiments of the present disclosure obtains the lidar pose corresponding to the target point cloud data by the point cloud splicing process, performs the self-positioning verification on the map based on the reflection value and the height value using the target point cloud data, and integrates the map based on the reflection value and the height value into the reference map only when the result of the self-positioning verification satisfies the preset condition, thereby generating a high precision map, which has a wider application range in comparison to the related technologies.

BRIEF DESCRIPTION OF DRAWINGS

In order to more clearly illustrate the embodiments of the present disclosure or the technical solutions in the prior art, a brief description of the drawings used in the description of the embodiments or the prior art will be briefly described below. Obviously, the drawings in the following description are some embodiments of the present disclosure, and those skilled in the art can obtain other drawings based on these drawings without any inventive labor.

DESCRIPTION OF EMBODIMENTS

In order to make the objectives, technical solutions, and advantages of the embodiments of the present disclosure more clearly, the technical solutions in the embodiments of the present disclosure are clearly and completely described in the following with reference to the accompanying drawings in the embodiments of the present disclosure. It is apparent that the described embodiments are a part of the embodiments, and not all of the embodiments of the present disclosure. All other embodiments obtained by those skilled in the art based on the embodiments of the present disclosure without any creative labor are within the protection scope of the present disclosure.

Based on the problem existing in the prior art, the embodiments of the present disclosure provide a method for generating a high precision map, an apparatus and a storage medium, which generate a high precision map of a centimeter level through techniques such as point cloud splicing process and self-positioning verification admission.

An application scenario of the embodiments of the present disclosure includes, but are not limited to, an automatic driving system, such as an automated driving system for an unmanned vehicle.

Figure 1:
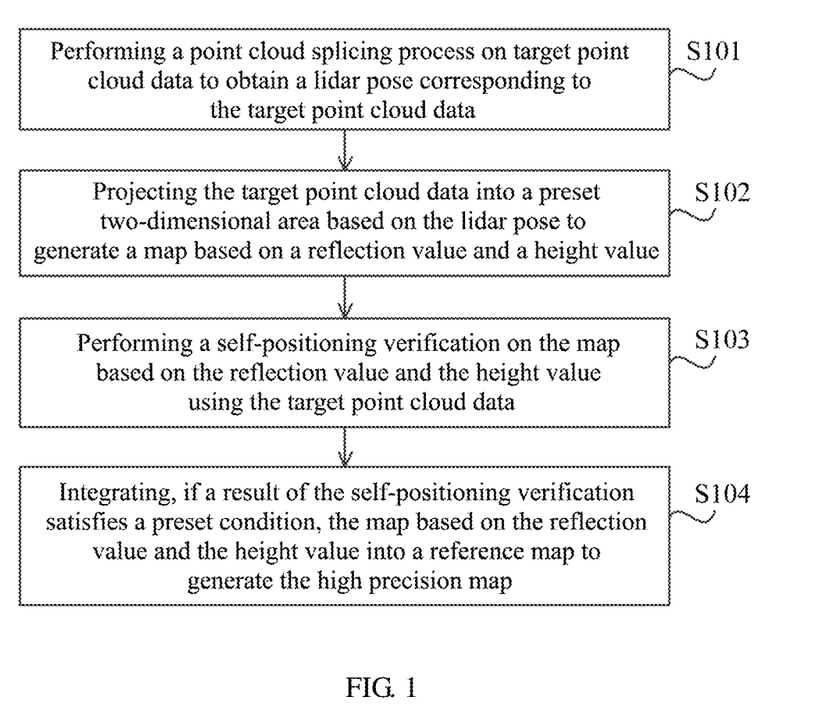
FIG. 1 is a flowchart of a method for generating a high precision map according to an embodiment of the present disclosure.

FIG. 1 is a flowchart of a method for generating a high precision map according to an embodiment of the present disclosure. The embodiment of the present disclosure provides a method for generating a high precision map, an execution subject of the method for generating the high precision map may be an apparatus for generating a high precision map. The apparatus for generating the high precision map can be implemented by software and/or hardware, where the hardware is, for example, a processor or an electronic device, the software is, for example, computer program instructions or applications. The apparatus for generating the high precision map can be an independent electronic device, or the apparatus for generating the high precision map can be integrated in the electronic device. The electronic device is, for example, a device such as a computer or a server. The present embodiment takes a server as the execution subject for illustration.

Specifically, the server includes, but is not limited to, a single network server, a server group composed of a plurality of network servers, or a cloud computing-based cloud composed of a large number of computers or network servers. Cloud computing is a kind of distributed computing, and is a super virtual computer composed of a group of loosely coupled computers.

As shown in FIG. 1, the method for generating the high precision map includes:

S101, performing a point cloud splicing process on target point cloud data to obtain a lidar pose corresponding to the target point cloud data.

The point cloud splicing process is a specific implementation of Simultaneous Localization And Mapping (SLAM) or Concurrent Mapping and Localization (CML), and a local smoothing between a plurality of target point cloud data can be achieved through the point cloud splicing process.

A point cloud data collected by a driverless car (also known as a smart car) is taken as an example for the target point cloud data. Since a laser scanning beam is blocked by an object, it is impossible to acquire a three-dimensional point cloud of the entire object by one-time scan, and therefore, it is necessary to scan the object from different positions and angles. Specifically, the driverless car is provided with components such as a lidar and a camera. The driverless car can collect data of a pathway environment through the lidar and the camera, and sent the data to the server after pre-processing. For example, the lidar emits a laser scanning beam, and the laser scanning beam, when encountering an object, is reflected back, and received by the lidar to complete one transmission and reception of the laser scanning beam. In this way, the driverless car can continuously collect a large amount of point cloud data. In practical applications, the driverless car can preprocess the large amount of point cloud data collected above, such as screening/filtering, to obtain the target point cloud data.

Due to the large amount of the target point cloud data, the frame is taken as a unit in an actual process. Between two or more frames of the target point cloud data, there may be point cloud data corresponding to the same area. Adjacent scanned target point cloud data can be spliced together and the lidar pose corresponding to the target point cloud data can also be obtained through the point cloud splicing process. The lidar pose corresponding to each frame takes a center of the lidar as a coordinate origin. As long as the lidar pose is known, each laser spot in the scanned target point cloud data can be coordinate-converted and converted into coordinate values in a global coordinate system.

It should be noted that the lidar pose corresponding to the target point cloud data obtained in this step is an optimized lidar pose, which is different from an initial pose of the lidar corresponding to the target point cloud data. The initial pose of this lidar can be obtained through Inertial Measurement Unit (IMU) and Global Navigation Satellite System (GNSS) device. Specifically, the pose may include a position and an attitude angle, and the position corresponds to a three-dimensional coordinate (x, y, z), and the attitude angle includes rotation angles respectively on three coordinate axes: a heading angle, a pitch angle, and a roll angle.

S102, projecting the target point cloud data into a preset two-dimensional area based on the lidar pose to generate a map based on a reflection value and a height value.

A global area includes a plurality of the preset two-dimensional areas. Specifically, the global area can be a province, a country, a continent, or even the whole world, and can be set according to actual needs. It can be understood that the global area is divided into a plurality of preset two-dimensional areas (map_node) according to a preset size, and the two-dimensional area is taken as a granularity for projection to obtain the number of laser spots projected into each preset two-dimensional area, reflection value information of the laser spots, and height value information of the laser spots. Then, the map based on the reflection value and the height value stores the number of laser spots projected therein, the reflection value information of the laser spots and the height value information of the laser spots in units of the preset two-dimensional area. The target point cloud data includes data corresponding to a plurality of laser spots.

Illustratively, the global area is the whole world. The while world coordinate system is divided into two-dimensional areas of fixed size, each preset two-dimensional area covers a certain range, so that when sizes and arrangement rules of the preset two-dimensional areas are known, the preset two-dimensional area where the coordinate is located can be calculated according to a coordinate of one laser spot. Optionally, for the world coordinate system, the embodiment of the present disclosure may adopt a Universal Transverse Mercartor grid System (UTM) coordinate system.

It is assumed that a coordinate of a laser spot of the laser scanning beam reflected after being irradiated onto the object is $P=(x, y, z)^T$, and a position of the laser spot in the world coordinate system can be determined according to x and y, and z is a height value of the laser spot. For each laser spot, the preset two-dimensional area into which the each laser spot falls can be calculated from x and y. The reflection value information may specifically be a reflection value, and the height value information may specifically be a height value, but the embodiment of the present disclosure is not limited thereto.

S103, performing a self-positioning verification on the map based on the reflection value and the height value using the target point cloud data.

In the embodiments of the present disclosure, the map based on the reflection value and the height value is generated by projecting the target point cloud data, and the step uses the target point cloud data for verification of the map based on the reflection value and the height value, that is, self-positioning verification. Since the map based on the reflection value and the height value is based on the lidar pose, and the lidar pose is an optimized lidar pose, when the target point cloud data is used to verify the map based on the reflection value and the height value, the two are not completely matched. After the self-positioning verification, it is judged whether or not the map based on the reflection value and the height value is integrated into a reference map based on a obtained result of the self-positioning verification. The reference map is a previously generated map.

Specifically, in a batch of target point cloud data, for a target point cloud data for a $n+1^{th}$ frame, the reference map is a map integrated with a map based on the reflection value and the height value corresponding to a target point cloud data for a $n^{th}$ frame, at this time, a result of the self-positioning verification corresponding to the target point cloud data for the $n^{th}$ frame satisfies a preset condition; alternatively, for the target point cloud data for the $n+1^{th}$ frame, the reference map is a map integrated with a map based on the reflection value and the height value corresponding to a target point cloud data for a $n-1^{th}$ frame, at this time, the result of the self-positioning verification corresponding to the target point cloud data for the $n^{th}$ frame does not satisfy the preset condition, but a result of the self-positioning verification corresponding to the target point cloud data for the $n-1^{th}$ frame satisfies the preset condition, and so on. Here, n takes an integer greater than one.

Similarly, in target point cloud data of different batches, for a target point cloud data for a first frame of a target point cloud data for a $m+1^{th}$ batch, the reference map is a map integrated with a map based on the reflection value and the height value corresponding to a target point cloud data for a last frame of a target point cloud data for an $m^{th}$ batch, at this time, a result of the self-positioning verification corresponding to the target point cloud data for the last frame of the target point cloud data for the $m^{th}$ batch satisfies the preset condition; alternatively, for the target point cloud data for the first frame of the target point cloud data for the $m+1^{th}$ batch, the reference map is a map integrated with a map based on the reflection value and the height value corresponding to a target point cloud data for a penultimate frame of the target point cloud data for the $m^{th}$ batch, at this time, the result of the self-positioning verification corresponding to the target point cloud data in the last frame for the target point cloud data for the $m^{th}$ batch does not satisfy the preset condition, but a result of the self-positioning verification corresponding to the target point cloud data for the penultimate frame of the target point cloud data for the $m^{th}$ batch satisfies the preset condition, and so on. Here, m takes an integer greater than zero.

S104, integrating, if a result of the self-positioning verification satisfies the preset condition, the map based on the reflection value and the height value into the reference map to generate the high precision map.

In this step, the preset condition may include, but is not limited to, a point cloud matching error satisfying a certain fixed value is within 10 cm, or the like. Illustratively, the fixed value may be 99.9%, or the like.

Integrating the map based on the reflection value and the height value into the reference map is to perform a integration process on the map based on the reflection value and the height value and the reference map, so that the integration processed map includes all the contents of the reference map as well as the content of the map based on the reflection value and the height value, and the integration processed map is the high precision map.

Optionally, the integration in the step refers to an integration in the preset two-dimensional area, but is not limited thereto. The integration granularity may be larger or smaller, and a larger integration granularity is, for example, a plurality of preset two-dimensional areas, or the like. Specifically, the number of the laser spots in each preset two-dimensional area in the reference map, the reflection value information of the laser spots and the height value information of the laser spots are updated according to the number of the laser spots in the corresponding preset two-dimensional area of the map based on the reflection value and the height value, the reflection value information of the laser spots and the height value information of the laser spots.

The embodiment of the present disclosure performs a point cloud splicing process on a target point cloud data to obtain a lidar pose corresponding to the target point cloud data; projects the target point cloud data into a preset two-dimensional area based on the lidar pose to generate a map based on a reflection value and a height value, where a global area includes a plurality of the preset two-dimensional areas, the map based on the reflection value and the height value stores a number of laser spots projected therein, reflection value information of the laser spots and height value information of the laser spots in units of the preset two-dimensional area, the target point cloud data includes data corresponding to a plurality of laser spots; performs a self-positioning verification on the map based on the reflection value and the height value using the target point cloud data; integrates, if a result of the self-positioning verification satisfies a preset condition, the map based on the reflection value and the height value into a reference map to generate the high precision map, where the reference map is a previously generated map. Since the embodiment of the present disclosure obtains the lidar pose corresponding to the target point cloud data by the point cloud splicing process, performs the self-positioning verification on the map based on the reflection value and the height value using the target point cloud data, and integrates the map based on the reflection value and the height value into the reference map only when the result of the self-positioning verification satisfies the preset condition, thereby generating a high precision map, which has a wider application range in comparison to the related technologies.

On the basis of the above embodiment, details of the implementation of the above steps will be specifically described below.

Figure 2:
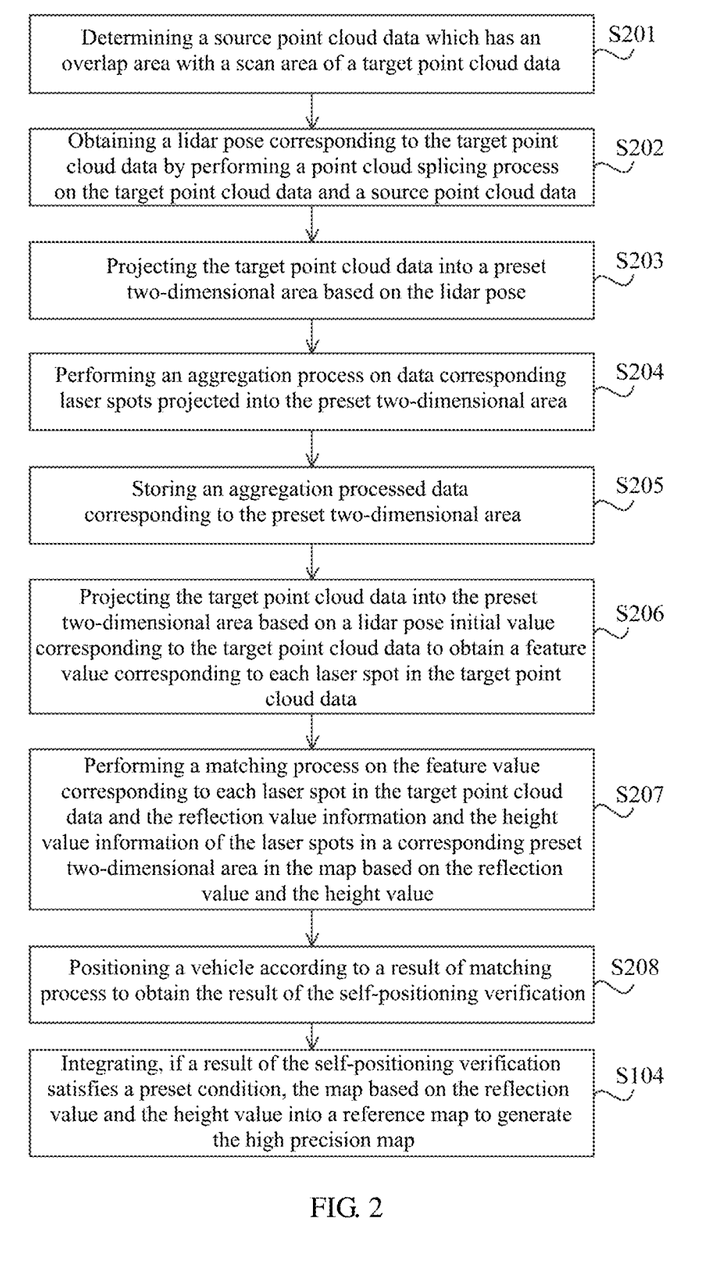
FIG. 2 is a flowchart of a method for generating a high precision map according to another embodiment of the present disclosure.

In an implementation, as shown in FIG. 2, S101, the performing a point cloud splicing process on target point cloud data to obtain a lidar pose corresponding to the target point cloud data may include:

S201, determining a source point cloud data which has an overlap area with a scan area of the target point cloud data.

The target point cloud data and the source point cloud data are relative concepts. For example, a point cloud data A may be a target point cloud data corresponding to a point cloud data B, and the point cloud data B may be a source point cloud data corresponding to the point cloud data A; similarly, the point cloud data B may be the target point cloud data corresponding to the point cloud data A, and the point cloud data A may be the source point cloud data corresponding to the point cloud data B. In other word, the target point cloud data and the source point cloud data are arbitrarily determined, and the purpose thereof is to calculate a relative positional conversion of the two point cloud data.

In some embodiments, the target point cloud data and the source point cloud data may be determined by a closed loop detection to constrain pose of multiple circles of lidars that pass through the same path.

S202, obtaining the lidar pose corresponding to the target point cloud data by performing a point cloud splicing process on the target point cloud data and the source point cloud data.

In some embodiments, this step may include: determining a pose adjustment amount of the target point cloud data relative to the source point cloud data, where the pose adjustment amount is configured to indicate that a pose of a source lidar corresponding to the source point cloud data is translated and/or rotated, so that the pose of the source lidar has a same adjustment amount with a pose of a target lidar corresponding to the target point cloud data; constructing an objective function according to the pose adjustment amount and a priori pose constraint, where the priori pose constraint is configured to indicate an adjustment amount of a lidar pose initial value corresponding to the target point cloud data relative to a lidar pose initial value corresponding to the source point cloud data; and minimizing the objective function to determine the lidar pose corresponding to the target point cloud data.

Specifically, two point cloud data that can be matched as one pair, such as a target point cloud data $X_i^1$ and a source point cloud data $X_i^2$, and $X_i^1$ and $X_i^2$ represent a target pose and a source pose in a pair. A target is to translate and rotate a position and an attitude angle of the source point cloud data, so that the pose adjustment amount (translation and rotation) is: $\Delta p$, so that the source point cloud data and the target point cloud data can match. A specific optimization process can be summarized as: calculating a residual of a corresponding laser spot, continuously optimizing the pose of the lidar, updating a search of the corresponding laser spot and the calculation of the corresponding residual, and minimizing the residual to obtain an optimized pose between point cloud data for two frames.

Therefore, set the pose adjustment amount for each pair:
pair1: $\Delta P_1$;
pair2: $\Delta p_2$;

These pose adjustment amounts can be used as a constraint condition in a globally optimized pose. A residual equation can be constructed by determining the objective function according to the constraint condition, together with the priori pose constraint provided by GPS+IMU, so as to minimize the objective function and solve the pose of the lidar in target cloud data for each frame:

The minus sign in the above formula is changed to a plus sign as follows:

$$\{\Delta p\} \leftarrow \underset{\Delta p_{ijk}}{\operatorname{argmin}}\left\{\sum_i \left\|(\Delta p_i \cdot x_i^2 - x_i^1)_{pair} + (\Delta \hat{p}_i \cdot x_i^2 - x_i^1)_{pair}\right\|^2\right\}$$

In the above formula, i takes a value of 1, 2, . . . ; $\Delta p_i$ is used to indicate a pose adjustment amount of an $i^{th}$ pair; $\Delta \hat{p}_i$ is used to indicate a priori pose constraint of the $i^{th}$ pair; the specific meanings of the remaining mathematical symbols can be referred to the related art, and are not described herein again.

Optionally, S102, the projecting the target point cloud data into a preset two-dimensional area based on the lidar pose to generate a map based on a reflection value and a height value may include:

S203, projecting the target point cloud data into the preset two-dimensional area based on the lidar pose.

S204, performing an aggregation process on data corresponding the laser spots projected into the preset two-dimensional area.

S205, storing an aggregation processed data corresponding to the preset two-dimensional area.

The aggregation processed data includes the number of the laser spots, a mean and a variance of the reflection value corresponding to the laser spots and a mean and a variance of the height value corresponding to the laser spots.

Since the target point cloud data is data corresponding to a series of laser spots. If all of them are stored in the preset two-dimensional area, data amount will be very large, and a matching efficiency is low. Therefore, each preset two-dimensional area is subdivided into a plurality of small grids (map_cell), and then an aggregation process is performed on the point cloud data falling into the same small grid. The aggregated data is stored in each small grid, so that the data amount of each preset two-dimensional area is fixed regardless of the number of laser spots.

The above aggregation process is to calculate a mean and a variance of a reflection value, and a mean and a variance of a height value corresponding to a plurality of laser spots, so that it is not necessary to save the mean and the variance of the reflection value, and the mean and the variance of the height value corresponding to each laser spot, so as to facilitate a storage and realize a controllable memory occupation without causing the memory to increase with the increase of the laser spots.

In further, S103, the performing a self-positioning verification on the map based on the reflection value and the height value using the target point cloud data can specifically include:

S206, projecting the target point cloud data into the preset two-dimensional area based on a lidar pose initial value corresponding to the target point cloud data to obtain a feature value corresponding to each laser spot in the target point cloud data.

The feature value includes a mean and a variance of the reflection value and a mean and a variance of the height value before the performing the point cloud splicing process on the target point cloud data.

S207, performing a matching process on the feature value corresponding to the each laser spot in the target point cloud data and the reflection value information and the height value information of the laser spots in a corresponding preset two-dimensional area of the map based on the reflection value and the height value.

Optionally, the matching process may specifically include: calculating a matching probability of each position respectively within a preset range centered on an initial predicted position to obtain a probability distribution of the positioning result; and updating the probability distribution of the positioning result by a histogram filter to obtain the matching process result. The initial predicted position may be a prediction of a vehicle position of the target point cloud data in a current frame completed by a positioning result of the target point cloud data in a previous frame together with a vehicle motion information given by a inertial navigation device.

For a newly started automatic driving system for a unmanned vehicle, an initialization process is included. In the initialization process, the initial predicted position is given by a Global Positioning System (GPS) signal, which has an error of about 2-5 m. After obtaining a coarse positioning, a final positioning result is obtained by fine positioning by matching with the map.

Figure 3:
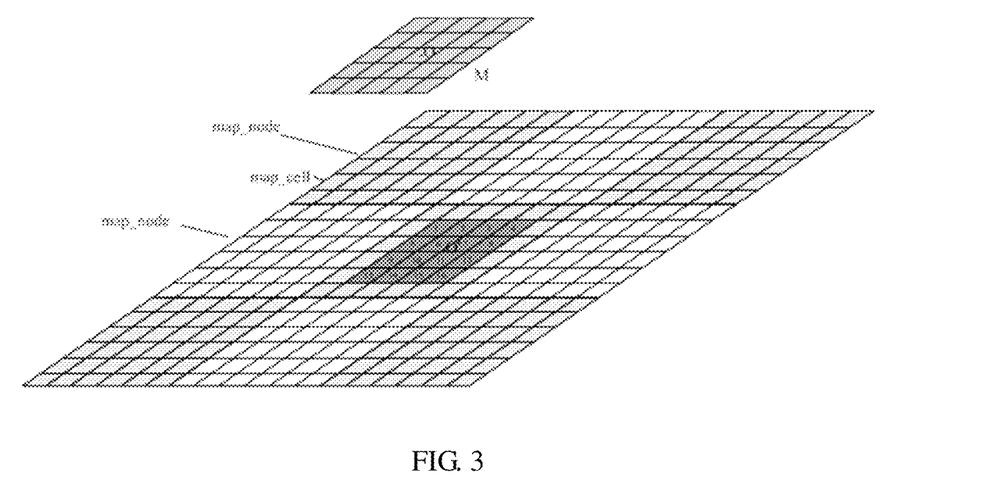
FIG. 3 is a schematic diagram of a matching process according to an embodiment of the present disclosure.

The specific matching process can refer to FIG. 3, the target point cloud data is also made into data structure in a two-dimensional rectangular area (i.e., M) based on the lidar pose initial value corresponding to the target point cloud data first, and then is matched with the map based on the reflection value and the height value.

S208, positioning a vehicle according to a result of matching process to obtain the result of the self-positioning verification.

The target point cloud data is collected by the vehicle. The vehicle is, for example, a driverless car, but is not limited thereto.

It is worth mentioned that when the self-positioning verification is performed, the lidar pose after the point cloud splicing process, that is, the optimized pose is used. The result of self-positioning verification has a great relationship with the sharpness of the map. The higher the accuracy of the map and the clearer the map, the smaller the error of point cloud positioning matching. Therefore, a positioning accuracy can be used as a verification method for map accuracy.

On the basis of the above, the preset condition may also be some empirical value: for example, the mean value is less than 5 cm, a maximum value is not more than 30 cm, or the like.

For large-scale urban 3D reconstruction, multiple acquisition devices, multiple acquisition paths, multiple days, and multiple batches of point cloud splicing may be required. In addition, an environment of a road may change at any time, such as road repair, or change with the seasons. For example, the leaves grow spring and fall, so the mapping needs to consider a validity period of the map. It is necessary to continuously collect new data and update the map in order to make the map consistent with a real environment of the outside world. With increasing application scenarios of autonomous driving, how to make large-scale high precision maps with centimeter-level accuracy is a huge challenge to accuracy, efficiency, and computing power. For ultra-large-scale mapping scenarios, a crowdsourcing solution is undoubtedly an effective solution.

Figure 4:
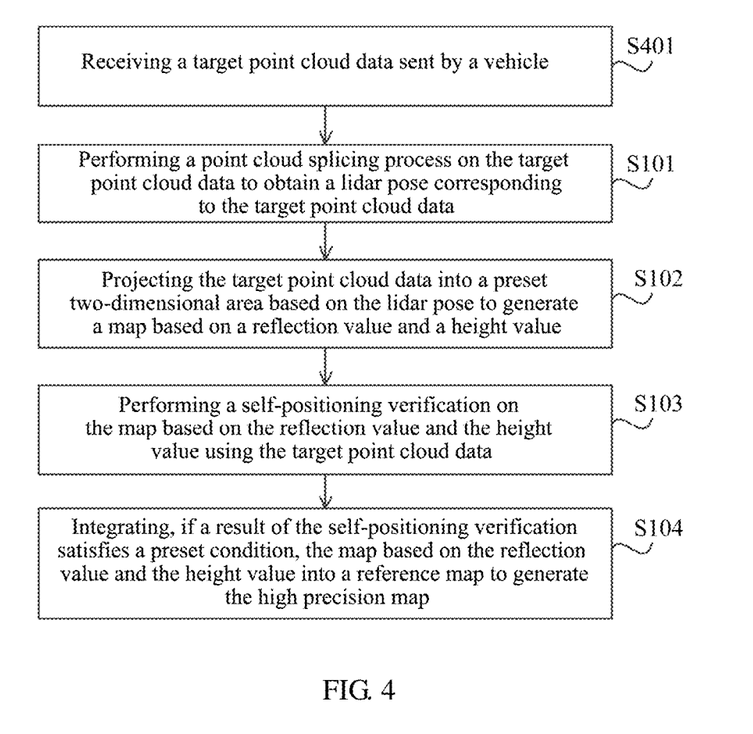
FIG. 4 is a flowchart of a method for generating a high precision map according to still another embodiment of the present disclosure.

Therefore, on the basis of the flow shown in FIG. 1 or FIG. 2, the method for generating the high precision map may further include: receiving the target point cloud data sent by a vehicle. For example, referring to FIG. 4, on the basis of the flow shown in FIG. 1, before the S101, performing a point cloud splicing process on target point cloud data to obtain a lidar pose corresponding to the target point cloud data, the method further includes:

S401, receiving the target point cloud data sent by a vehicle.

Optionally, the target point cloud data is a point cloud data preprocessed by the vehicle. The preprocess may include filtering data having a duration shorter than a first preset value, and/or data having a corresponding number of kilometers less than a second preset value, or the like. For the data which has a duration shorter than the first preset value, and the data which has a corresponding number of kilometers less than the second preset value, these data is static or has a too small magnitude in a large probability, and can be ignored in a rough screening process, so that data transmission efficiency can be improved to some extent.

The acquisition of the corresponding number of kilometers can be accumulated according to a distance between frames, where the point cloud data has position coordinates of each frame.

The collected point cloud data will be placed order when the vehicle is going out for daily operations every day, and uploaded to the server after pre-processed in a vehicle end in an evening charging mode.

Figure 5:
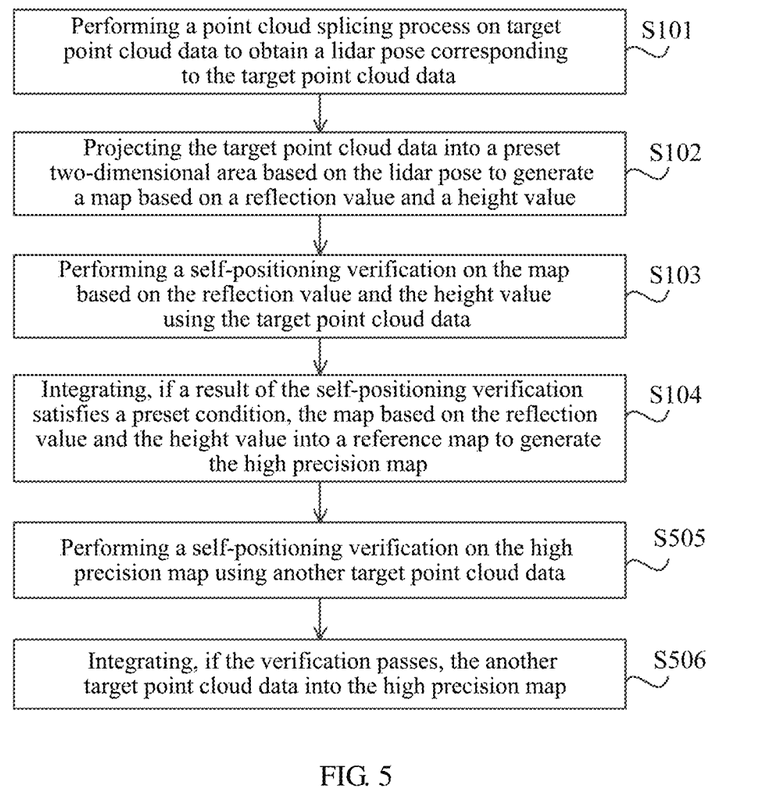
FIG. 5 is a flowchart of a method for generating a high precision map according to still another embodiment of the present disclosure.

FIG. 5 is a flowchart of a method for generating a high precision map according to another embodiment of the present disclosure. As shown in FIG. 5, the method for generating the high precision map may include:

S501, performing a point cloud splicing process on target point cloud data to obtain a lidar pose corresponding to the target point cloud data.

S502, projecting the target point cloud data into a preset two-dimensional area based on the lidar pose to generate a map based on a reflection value and a height value.

S503, performing a self-positioning verification on the map based on the reflection value and the height value using the target point cloud data.

S504, integrating, if a result of the self-positioning verification satisfies a preset condition, the map based on the reflection value and the height value into a reference map to generate the high precision map.

S501 to S504 are the same as S101 to S104. The details may be reference to the embodiment shown in FIG. 1, and are not described herein again.

S505, performing a self-positioning verification on the high precision map using another target point cloud data.

Specifically, this step is similar to S503, and details are not described herein again.

S506, integrating, if the verification passes, the another target point cloud data into the high precision map.

This step is similar to S504, and details are not described herein again.

S506 is repeated until the batch of point cloud data is successfully integrated, and the update of the map is completed.

The embodiment performs self-positioning verification admission through crowdsourcing point cloud data collection, point cloud splicing process, the map based on the reflection value and the height value, integrates the map based on the reflection value and the height value and the reference map to generate a new map, and performs a self-positioning verification admission on the new map. Through a fine screening strategy, a precise point cloud splicing process, and a strict auditing standard, and finally through crowdsourcing update, the entire process ensures periodic output of centimeter-level high precision maps.

It should also be noted that the update period of the map can be customized. For example, a new high precision map is released every week.

Figure 6:
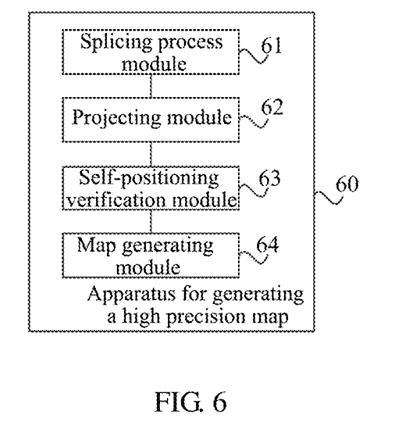
FIG. 6 is a schematic structural diagram of a device for generating a high precision map according to an embodiment of the present disclosure.

FIG. 6 is a schematic structural diagram of an apparatus for generating a high precision map according to an embodiment of the present disclosure. The embodiment of the present disclosure provides an apparatus for generating a high precision map, the apparatus for generating the high precision map can be implemented by software and/or hardware, and the apparatus for generating the high precision map can be an independent electronic device, or the apparatus for generating the high precision map can be integrated in the electronic device. The electronic device is, for example, a device such as a computer or a server. The present embodiment takes a server as the execution subject for illustration.

Specifically, the server includes, but is not limited to, a single network server, a server group composed of a plurality of network servers, or a cloud computing-based cloud composed of a large number of computers or network servers. Cloud computing is a kind of distributed computing, and is a super virtual computer composed of a group of loosely coupled computers.

As shown in FIG. 6, the apparatus for generating the high precision map 60 includes: a splicing process module 61, a projecting module 62, a self-positioning verification module 63 and a map generating module 64.

The splicing process module 61 is configured to perform a point cloud splicing process on target point cloud data to obtain a lidar pose corresponding to the target point cloud data.

The projecting module 62 is configured to project the target point cloud data into a preset two-dimensional area based on the lidar pose obtained by the splicing process module 61 to generate a map based on a reflection value and a height value. A global area includes a plurality of the preset two-dimensional areas. The map based on the reflection value and the height value stores the number of the laser spots, reflection value information of laser spots and height value information of the laser spots projected therein in units of the preset two-dimensional area. The target point cloud data includes data corresponding to a plurality of laser spots.

The self-positioning verification module 63 is configured to perform a self-positioning verification on the map based on the reflection value and the height value generated by the projecting module 62 using the target point cloud data.

The map generating module 64 is configured to integrate, when a result of the self-positioning verification obtained by the self-positioning verification module 63 satisfies a preset condition, the map based on the reflection value and the height value into a reference map to generate the high precision map. The reference map is a previously generated map.

The apparatus for generating the high precision map provided in the present embodiment may be used to perform the foregoing method embodiments. The implementation manners and technical effects thereof are similar, and details are not described herein again.

Figure 7:
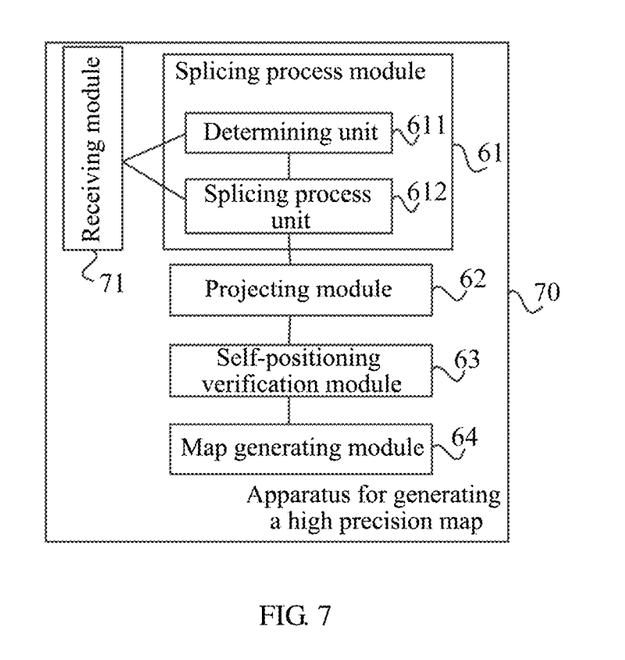
FIG. 7 is a schematic structural diagram of a device for generating a high precision map according to another embodiment of the present disclosure.

Based on the foregoing embodiment, in an implementation, as shown in FIG. 7, the splicing process module 61 may include: a determining unit 611 and a splicing process unit 612.

The determining unit 611 is configured to determine a source point cloud data which has an overlap area with a scan area of the target point cloud data.

the splicing process unit 612 is configured to obtain the lidar pose corresponding to the target point cloud data by performing a point cloud splicing process on the target point cloud data and the source point cloud data.

Optionally, the splicing process unit 612 may specifically be configured to:

determine a pose adjustment amount of the target point cloud data relative to the source point cloud data, where the pose adjustment amount is configured to indicate that a pose of a source lidar corresponding to the source point cloud data is translated and/or rotated, so that the pose of the source lidar has a same adjustment amount with a pose of a target lidar corresponding to the target point cloud data;

construct an objective function according to the pose adjustment amount and a priori pose constraint, where the priori pose constraint is configured to indicate an adjustment amount of a lidar pose initial value corresponding to the target point cloud data relative to a lidar pose initial value corresponding to the source point cloud data; and minimize the objective function to determine the lidar pose corresponding to the target point cloud data.

In some embodiments, the projecting module 62 may specifically be configured to:

project the target point cloud data into the preset two-dimensional area based on the lidar pose;

perform an aggregation process on data corresponding the laser spots projected into the preset two-dimensional area; and store an aggregation processed data corresponding to the preset two-dimensional area.

The aggregation processed data may include the number of the laser spots, a mean and a variance of the reflection value corresponding to the laser spots and a mean and a variance of the height value corresponding to the laser spots, or the like.

In some embodiments, the self-positioning verification module 63 may specifically be configured to:

project the target point cloud data into the preset two-dimensional area based on a lidar pose initial value corresponding to the target point cloud data to obtain a feature value corresponding to each laser spot in the target point cloud data, where the feature value may include a mean and a variance of the reflection value and a mean and a variance of the height value before the performing the point cloud splicing process on the target point cloud data;

perform a matching process on the feature value corresponding to each laser spot in the target point cloud data and the reflection value information and the height value information of the laser spots in a corresponding preset two-dimensional area in the map based on the reflection value and the height value; and position a vehicle according to a result of matching process to obtain the result of the self-positioning verification. The target point cloud data is collected by the vehicle.

Further, the above matching process may specifically include:

calculating a matching probability of each position respectively within a preset range centered on an initial predicted position to obtain a probability distribution of a positioning result, where the initial predicted position is a prediction of a vehicle position of the target point cloud data in a current frame completed by a positioning result of the target point cloud data in a previous frame together with a vehicle motion information given by a inertial navigation device; and updating the probability distribution of the positioning result by a histogram filter to obtain the matching process result.

In some embodiments, the map generating module 64 may specifically be configured to: update, in units of the preset two-dimensional area, the number of the laser spots, the reflection value information of the laser spots and the height value information of the laser spots in a corresponding preset two-dimensional area in the reference map according to the number of the laser spots, the reflection value information of the laser spots and the height value information of the laser spots in each preset two-dimensional area of the map based on the reflection value and the height value.

On the basis of the above embodiments, in addition, the device for generating the high precision map 70 may further include: a receiving module 71.

The receiving module 71 is configured to receive the target point cloud data sent by a vehicle before the splicing process module 61 performs the point cloud splicing process on the target point cloud data to obtain the lidar pose corresponding to the target point cloud data.

Optionally, the target point cloud data may be a point cloud data preprocessed by the vehicle. The preprocess may include, but not limited thereto, data filtering data having a duration shorter than a first preset value, and/or data having a corresponding number of kilometers less than a second preset value.

Optionally, the self-positioning verification module 63 is further configured to perform a self-positioning verification on the high precision map using an another target point cloud data after the map generating module 64 integrates the map based on the reflection value and the height value into the reference map to generate the high precision map. Correspondingly, the map generating module 64 is further configured to integrate, if a result of the self-positioning verification obtained by the self-positioning verification module 63 satisfies the preset condition, the another target point cloud data into the high precision map.

Figure 8:
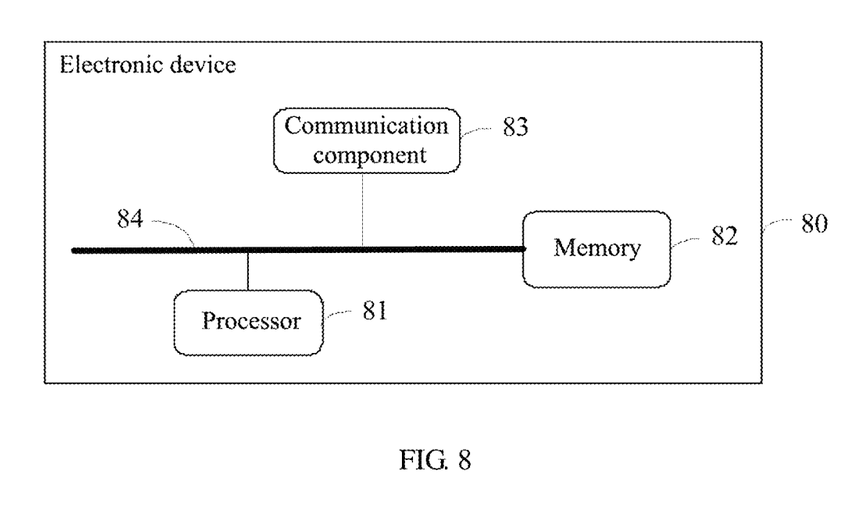
FIG. 8 is a schematic structural diagram of an electronic device according to an embodiment of the present disclosure.

FIG. 8 is a schematic structural diagram of an electronic device according to an embodiment of the present disclosure. As shown in FIG. 8, the electronic device 80 includes:

a processor 81 and a memory 82;

where the memory 82 stores computer execution instructions;

the processor 81 executes the computer execution instructions, so that the electronic device 80 executes the method for generating the high precision map as described above. The implementation principle and technical effects thereof are similar, and the details are not described herein again.

Optionally, the electronic device 80 further includes a communication component 83. The processor 81, the memory 82, and the communication component 83 can be connected through a bus 84. The electronic device 80 performs information interaction with other electronic devices through the communication component 83.

The embodiment of the present disclosure further provides a computer readable storage medium, where the computer readable storage medium stores computer execution instructions, the computer execution instructions, when executed by a processor, implement the method for generating the high precision map as described above.

In the above embodiments, it should be understood that the disclosed device and method may be implemented in other manners. For example, the device embodiments described above are only illustrative. For example, the division of the module is only a logical function division, and the actual implementation may have another division manner. For example, multiple modules may be combined or integrated into another system, or some features may be omitted or not implemented. In addition, the mutual coupling or direct coupling or communication connection shown or discussed may be an indirect coupling or communication connection through some interface, apparatus or module, and may be electrical, mechanical or otherwise.

The modules described as separate components may or may not be physically separated, and the components displayed as modules may or may not be physical units, that is, may be located in one place, or may be distributed to multiple network units. Some or all of the modules may be selected according to actual needs to achieve the purpose of the solution of the embodiment.

In addition, each functional module in each embodiment of the present disclosure may be integrated into one processing unit, or each module may exist physically separately, or two or more modules may be integrated into one unit. The unit formed by the above modules can be implemented in the form of hardware or in the form of hardware plus software functional units.

The above-described integrated modules implemented in the form of software function modules can be stored in a computer readable storage medium. The software functional modules described above are stored in a storage medium and include instructions for causing a computer device (which may be a personal computer, a server, or a network device, etc.) or processor to perform parts of the steps of the methods described in various embodiments of the present application.

It should be understood that the foregoing processor may be a central processing unit (CPU), or may be other general purpose processors, a digital signal processor (DSP), an application specific integrated circuit (ASIC), or the like. The general purpose processor may be a microprocessor, or the processor may also be any conventional processor, or the like. The steps of the method disclosed in connection with the present disclosure may be directly embodied by the execution of the hardware processor or by a combination of hardware and software modules in the processor.

The memory may include high speed RAM memory, and may also include non-volatile memory NVM, such as at least one disk memory, and may also be a USB flash drive, a removable hard disk, a read only memory, a magnetic disk, or an optical disk, or the like.

The bus may be an Industry Standard Architecture (ISA) bus, a Peripheral Component (PCI) bus, or an Extended Industry Standard Architecture (EISA) bus, or the like. The bus can be divided into an address bus, a data bus, a control bus, or the like. For ease of representation, the bus in the drawings of the present application is not limited to only one bus or one type of bus.

The above storage medium may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk. The storage medium may be any available media that can be accessed by a general purpose or special purpose computer.

An exemplary storage medium is coupled to the processor to enable the processor to read information from, and write information to, the storage medium. Of course, the storage medium can also be a constituent part of the processor. The processor and the storage medium may be located in an Application Specific Integrated Circuits (ASIC). Of course, the processor and the storage medium may also exist as discrete components in a terminal or a server.

Those skilled in the art will appreciate that all or part of the steps to implement the various method embodiments described above may be accomplished by hardware associated with the program instructions. The aforementioned program can be stored in a computer readable storage medium. The program, when executed, performs the steps including the foregoing method embodiments; and the foregoing storage medium includes various media that can store program codes, such as a ROM, a RAM, a magnetic disk, or an optical disk.

Finally, it should be noted that the above embodiments are only for explaining the technical solutions of the present disclosure, and are not limited thereto; although the present disclosure has been described in detail with reference to the foregoing embodiments, it should be understood by those skilled in the art that: those skilled in the art may still modify the technical solutions described in the foregoing embodiments, or equivalently replace some or all of the technical features thereof; and the modifications or replacements do not deviate the essence of the corresponding technical solution from the scope of the technical solutions of the embodiments of the present disclosure.

What is claimed is:

1. A method for generating a high precision map, comprising:

performing, by a processor of an apparatus for generating a high precision map, a point cloud splicing process on target point cloud data to obtain a lidar pose corresponding to the target point cloud data, wherein the target point cloud data is collected by an autonomous vehicle;

projecting, by the processor, the target point cloud data into a preset two-dimensional area based on the lidar pose to generate a map based on a reflection value and a height value, wherein a global area comprises a plurality of the preset two-dimensional areas, the map based on the reflection value and the height value stores the number of laser spots, reflection value information of the laser spots and height value information of the laser spots projected therein, in units of the preset two-dimensional area, the target point cloud data comprises data corresponding to a plurality of laser spots;

performing, by the processor, a self-positioning verification on the map based on the reflection value and the height value using the target point cloud data; and integrating, by the processor, when a result of the self-positioning verification satisfies a preset condition, the map based on the reflection value and the height value into a reference map to generate the high precision map, wherein the reference map is a previously generated map;

performing perception, path planning or positioning of the autonomous vehicle, according to the high precision map generated;

wherein the performing, by the processor, a point cloud splicing process on target point cloud data to obtain a lidar pose corresponding to the target point cloud data comprises:

determining, by the processor, a source point cloud data which has an overlap area with a scan area of the target point cloud data; wherein there exists a pose adjustment amount between the source point cloud data and the target point cloud data; and obtaining, by the processor, the lidar pose corresponding to the target point cloud data by performing the point cloud splicing process on the target point cloud data and the source point cloud data.

2. The method for generating the high precision map according to claim 1, wherein the obtaining, by the processor, the lidar pose corresponding to the target point cloud data by performing a point cloud splicing process on the target point cloud data and the source point cloud data comprises:

determining, by the processor, a pose adjustment amount of the target point cloud data relative to the source point cloud data, wherein the pose adjustment amount is configured to indicate that a pose of a source lidar corresponding to the source point cloud data is translated and/or rotated, so that the pose of the source lidar has a same adjustment amount with a pose of a target lidar corresponding to the target point cloud data;

constructing, by the processor, an objective function according to the pose adjustment amount and a priori pose constraint, wherein the priori pose constraint is configured to indicate an adjustment amount of a lidar pose initial value corresponding to the target point cloud data relative to a lidar pose initial value corresponding to the source point cloud data; and minimizing, by the processor, the objective function to determine the lidar pose corresponding to the target point cloud data.

3. The method for generating the high precision map according to claim 1, wherein the projecting, by the processor, the target point cloud data into a preset two-dimensional area based on the lidar pose to generate a map based on a reflection value and a height value comprises:

projecting, by the processor, the target point cloud data into the preset two-dimensional area based on the lidar pose;

performing, by the processor, an aggregation process on data corresponding the laser spots projected into the preset two-dimensional area; and storing, by the processor, an aggregation processed data corresponding to the preset two-dimensional area, wherein the aggregation processed data comprises the number of the laser spots, a mean and a variance of the reflection value corresponding to the laser spots and a mean and a variance of the height value corresponding to the laser spots.

4. The method for generating the high precision map according to claim 1, wherein the integrating the map based on the reflection value and the height value into a reference map to generate the high precision map comprises:

updating, by the processor, in units of the preset two-dimensional area, the number of the laser spots, the reflection value information of the laser spots and the height value information of the laser spots in a corresponding preset two-dimensional area in the reference map according to the number of the laser spots, the reflection value information of the laser spots and the height value information of the laser spots in each preset two-dimensional area of the map based on the reflection value and the height value.

5. The method for generating the high precision map according to claim 1, wherein after the integrating, by the processor, the map based on the reflection value and the height value into a reference map to generate the high precision map, further comprising:

performing, by the processor, a self-positioning verification on the high precision map using another target point cloud data; and integrating, by the processor, when a result of the self-positioning verification satisfies the preset condition, the another target point cloud data into the high precision map.

6. The method for generating the high precision map according to claim 1, wherein the point cloud splicing process is performed to realize a local smoothing between a plurality of target point cloud data.

7. The method for generating the high precision map according to claim 1, wherein the point cloud splicing process is a specific implementation of simultaneous localization and mapping.

8. The method for generating the high precision map according to claim 1, wherein the performing, by the processor, a self-positioning verification on the map based on the reflection value and the height value using the target point cloud data comprises:

projecting, by the processor, the target point cloud data into the preset two-dimensional area based on a lidar pose initial value corresponding to the target point cloud data to obtain a feature value corresponding to each laser spot in the target point cloud data, wherein the feature value comprises a mean and a variance of the reflection value and a mean and a variance of the height value before the performing the point cloud splicing process on the target point cloud data;

performing, by the processor, a matching process on the feature value corresponding to each laser spot in the target point cloud data and the reflection value information and the height value information of the laser spots in a corresponding preset two-dimensional area in the map based on the reflection value and the height value; and positioning, by the processor, the autonomous vehicle according to a result of matching process to obtain the result of the self-positioning verification.

9. The method for generating the high precision map according to claim 5, wherein the matching process is specifically comprises:

calculating, by the processor, a matching probability of each position respectively within a preset range centered on an initial predicted position to obtain a probability distribution of a positioning result, wherein the initial predicted position is a prediction of a vehicle position of the target point cloud data in a current frame completed by a positioning result of the target point cloud data in a previous frame together with a vehicle motion information given by a inertial navigation device; and updating, by the processor, the probability distribution of the positioning result by a histogram filter to obtain the matching process result.

10. The method for generating the high precision map according to claim 1, wherein before the performing a point cloud splicing process on target point cloud data to obtain a lidar pose corresponding to the target point cloud data, the method further comprises:

receiving, by the processor, the target point cloud data sent by the autonomous vehicle.

11. The method for generating the high precision map according to claim 8, wherein the target point cloud data is a point cloud data preprocessed by the autonomous vehicle, wherein the preprocess comprises filtering data having a duration shorter than a first preset value, and/or data having a corresponding number of kilometers less than a second preset value.

12. An apparatus for generating a high precision map, comprising a processor and a memory wherein the memory has a computer program stored therein; and
the processor, when executing the computer program, is configured to:
perform a point cloud splicing process on target point cloud data to obtain a lidar pose corresponding to the target point cloud data, wherein the target point cloud data is collected by an autonomous vehicle;
project the target point cloud data into a preset two-dimensional area based on the lidar pose to generate a map based on a reflection value and a height value, wherein a global area comprises a plurality of the preset two-dimensional areas, the map based on the reflection value and the height value stores the number of the laser spots, reflection value information of laser spots and height value information of the laser spots projected therein in units of the preset two-dimensional area, the target point cloud data comprises data corresponding to a plurality of laser spots;
perform a self-positioning verification on the map based on the reflection value and the height value;
integrate, when a result of the self-positioning verification satisfies a preset condition, the map based on the reflection value and the height value into a reference map to generate the high precision map,
enable the autonomous vehicle to perform perception, path planning or positioning of the autonomous vehicle according to the high precision map generated, wherein the reference map is a previously generated map;
wherein the performing the point cloud splicing process on the target point cloud data to obtain the lidar pose corresponding to the target point cloud data comprises:
determining a source point cloud data which has an overlap area with a scan area of the target point cloud data; wherein there exists a pose adjustment amount between the source point cloud data and the target point cloud data; and obtaining the lidar pose corresponding to the target point cloud data by performing a point cloud splicing process on the target point cloud data and the source point cloud data.

13. The apparatus for generating a high precision map according to claim 11, wherein the processor is configured to:

determine a pose adjustment amount of the target point cloud data relative to the source point cloud data, wherein the pose adjustment amount is configured to indicate that a pose of a source lidar corresponding to the source point cloud data is translated and/or rotated, so that the pose of the source lidar has a same adjustment amount with a pose of a target lidar corresponding to the target point cloud data;

construct an objective function according to the pose adjustment amount and a priori pose constraint, wherein the priori pose constraint is configured to indicate an adjustment amount of a lidar pose initial value corresponding to the target point cloud data relative to a lidar pose initial value corresponding to the source point cloud data; and minimize the objective function to determine the lidar pose corresponding to the target point cloud data.

14. The apparatus for generating a high precision map according to claim 12, wherein the processor is configured to:

project the target point cloud data into the preset two-dimensional area based on the lidar pose;
perform an aggregation process on data corresponding the laser spots projected into the preset two-dimensional area; and
store an aggregation processed data corresponding to the preset two-dimensional area, wherein the aggregation processed data comprises the number of the laser spots, a mean and a variance of the reflection value corresponding to the laser spots and a mean and a variance of the height value corresponding to the laser spots.

15. The apparatus for generating a high precision map according to claim 12, wherein the processor is configured to:

update, in units of the preset two-dimensional area, the number of the laser spots, the reflection value information of the laser spots and the height value information of the laser spots in a corresponding preset two-dimensional area in the reference map according to the number of the laser spots, the reflection value information of the laser spots and the height value information of the laser spots in each preset two-dimensional area of the map based on the reflection value and the height value.

16. The apparatus for generating a high precision map according to claim 12, wherein the processor is further configured to:

receive the target point cloud data sent by the autonomous vehicle.

17. The apparatus for generating a high precision map according to claim 12, wherein the processor is further configured to:

perform a self-positioning verification on the high precision map using another target point cloud data; and
integrate, when a result of the self-positioning verification satisfies the preset condition, the another target point cloud data into the high precision map.

18. The apparatus for generating a high precision map according to claim 12, wherein the processor is configured to:

project the target point cloud data into the preset two-dimensional area based on a lidar pose initial value corresponding to the target point cloud data to obtain a feature value corresponding to each laser spot in the target point cloud data, wherein the feature value comprises a mean and a variance of the reflection value and a mean and a variance of the height value before the performing the point cloud splicing process on the target point cloud data;

perform a matching process on the feature value corresponding to each laser spot in the target point cloud data and the reflection value information and the height value information of the laser spots in a corresponding preset two-dimensional area in the map based on the reflection value and the height value; and position the autonomous vehicle according to a result of matching process to obtain the result of the self-positioning verification.

19. The apparatus for generating a high precision map according to claim 18, wherein the processor is configured to:

calculate a matching probability of each position respectively within a preset range centered on an initial predicted position to obtain a probability distribution of a positioning result, wherein the initial predicted position is a prediction of a vehicle position of the target point cloud data in a current frame completed by a positioning result of the target point cloud data in a previous frame together with a vehicle motion information given by a inertial navigation device; and update the probability distribution of the positioning result by a histogram filter to obtain the matching process result.

20. A non-transitory computer readable storage medium, wherein the computer readable storage medium stores computer execution instructions, the computer execution instructions, when executed by a processor, implement the method for generating the high precision map according to claim 1.

* * * * *